(12) United States Patent
Silver

(10) Patent No.: US 8,224,700 B2
(45) Date of Patent: Jul. 17, 2012

(54) SYSTEM AND METHOD FOR MANAGING RESTAURANT CUSTOMER DATA ELEMENTS

(76) Inventor: Andrew Silver, Dallas, TX (US)

( * ) Notice: Subject to any disclaimer, the term of this patent is extended or adjusted under 35 U.S.C. 154(b) by 1182 days.

(21) Appl. No.: 10/642,841

(22) Filed: Aug. 18, 2003

(65) Prior Publication Data

US 2005/0043996 A1 Feb. 24, 2005
US 2011/0313867 A9 Dec. 22, 2011

Related U.S. Application Data

(60) Provisional application No. 60/404,462, filed on Aug. 19, 2002.

(51) Int. Cl.
*G06F 17/60* (2006.01)

(52) U.S. Cl. .......... 705/15; 705/16; 705/5; 705/26; 235/379; 283/602

(58) Field of Classification Search .......... 705/15, 705/16; 235/379; 283/602
See application file for complete search history.

(56) References Cited

U.S. PATENT DOCUMENTS

| | | | | |
|---|---|---|---|---|
| 6,019,393 | A * | 2/2000 | Loebner | 283/60.2 |
| 6,741,969 | B1 * | 5/2004 | Chen et al. | 705/14 |
| 6,844,893 | B1 * | 1/2005 | Miller et al. | 348/14.1 |
| 6,848,613 | B2 * | 2/2005 | Nielsen et al. | 235/379 |
| 6,960,988 | B2 * | 11/2005 | Blink et al. | 340/286.09 |
| 6,973,437 | B1 * | 12/2005 | Olewicz et al. | 705/15 |
| 2002/0026364 | A1 * | 2/2002 | Mayer et al. | 705/15 |
| 2002/0147647 | A1 * | 10/2002 | Ragsdale-Elliott et al. | 705/15 |
| 2002/0156683 | A1 * | 10/2002 | Stoutenburg et al. | 705/16 |
| 2004/0054592 | A1 * | 3/2004 | Hernblad | 705/15 |
| 2005/0086117 | A1 * | 4/2005 | Kanisawa et al. | 705/26 |

* cited by examiner

*Primary Examiner* — Vanel Frenel

(57) ABSTRACT

This invention is a system and method for managing restaurant customer data elements.

18 Claims, 6 Drawing Sheets

US 8,224,700 B2

SYSTEM AND METHOD FOR MANAGING RESTAURANT CUSTOMER DATA ELEMENTS

CLAIM OF PRIORITY

This application claims priority to U.S. Provisional Application No. 60/404,462 entitled SYSTEM AND METHODS FOR SUPPORTING CUSTOMER-MANAGED PROCESSES AND TECHNOLOGIES IN THE HOSPITALITY FOOD SERVICE (RESTAURANT) INDUSTRY, to common inventor Andrew Silver filed on Aug. 19, 2002.

TECHNICAL FIELD

The present invention generally relates to customer service management systems and methods, and more specifically to restaurant customer service management systems and methods.

STATEMENT OF A PROBLEM ADDRESSED BY THIS INVENTION

Interpretation Considerations

This section describes the technical field in more detail, and discusses problems encountered in the technical field. This section does not describe prior art as defined for purposes of anticipation or obviousness under 35 U.S.C. section 102 or 35 U.S.C. section 103. Thus, nothing stated in the Statement of a Problem Addressed by This Invention is to be construed as prior art Discussion The restaurant and hospitality industry is rapidly changing as a result of the change in the demographics of its customer base and the introduction of new technology. The traditional restaurant experience in which a customer partakes is similar to a model that has been employed for hundreds of years.

The current generation of restaurant customers and operators label this model as antiquated. The current generation of restaurant customers is generally educated, highly competent with technology, and considers time as a valuable commodity. These customers are often impatient and enjoy continuous and interactive entertainment while waiting to be seated or while waiting for a meal to be prepared.

Unfortunately, current restaurant systems, although proven, do not meet the changing needs of this new customer base. Restaurants antiquated systems are cumbersome, lack modern technology, and do not provide entertainment during waiting periods. Furthermore, they are very dependent on management and control from restaurant staff.

BRIEF DESCRIPTION OF THE DRAWINGS

Various aspects of the invention, as well as at least one embodiment, are better understood by reference to the following EXEMPLARY EMBODIMENT OF A BEST MODE. To better understand the invention, the EXEMPLARY EMBODIMENT OF A BEST MODE should be read in conjunction with the drawings in which.

AN EXEMPLARY EMBODIMENT OF A BEST MODE

Interpretation Considerations

Figure 1:
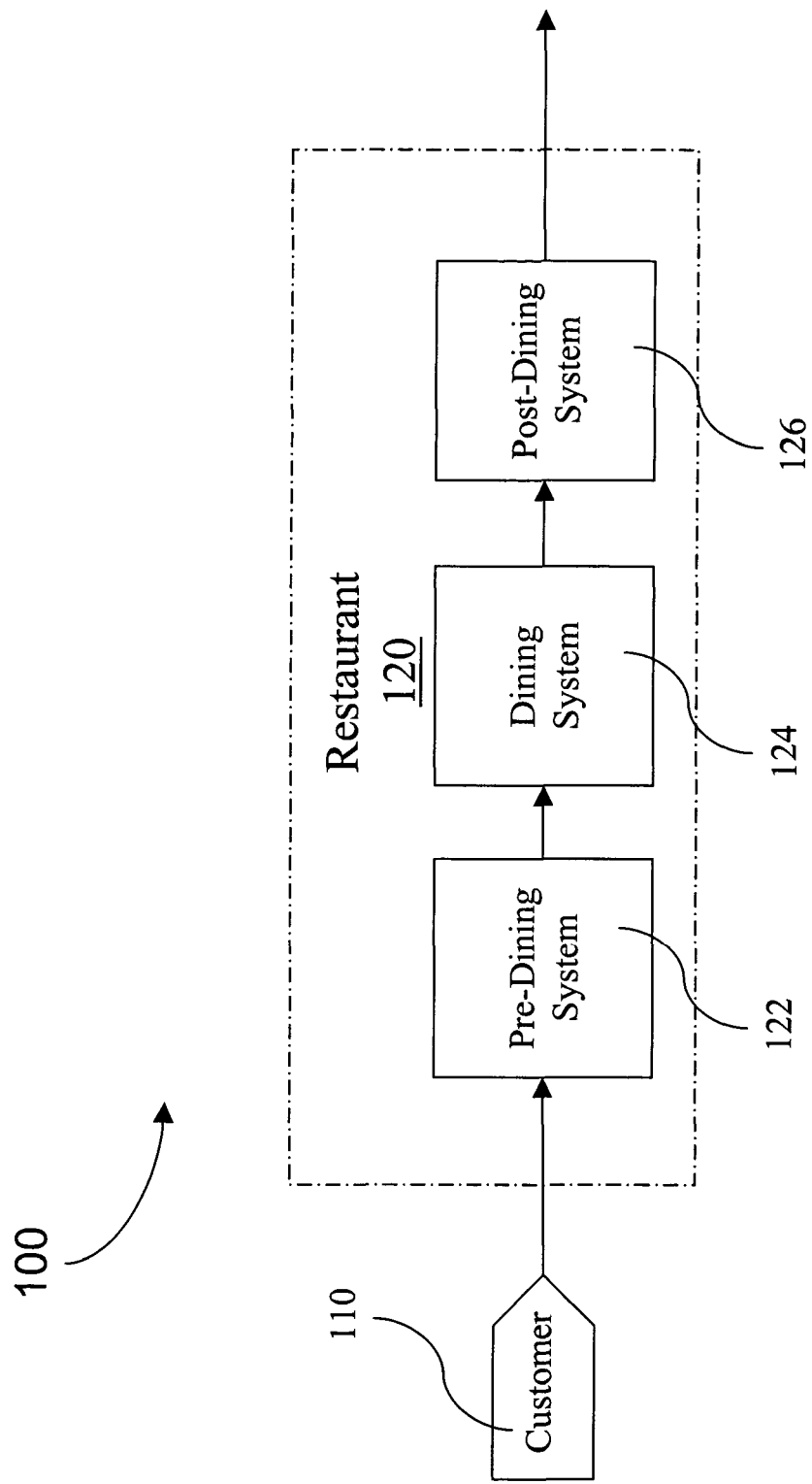
FIG. 1 illustrates a restaurant customer management system.

When reading this section (An Exemplary Embodiment of a Best Mode, which describes an exemplary embodiment of the best mode of the invention, hereinafter "exemplary embodiment"), one should keep in mind several points. First, the following exemplary embodiment is what the inventor believes to be the best mode for practicing the invention at the time this patent was filed. Thus, since one of ordinary skill in the art may recognize from the following exemplary embodiment that substantially equivalent structures or substantially equivalent acts may be used to achieve the same results in exactly the same way, or to achieve the same results in a not dissimilar way, the following exemplary embodiment should not be interpreted as limiting the invention to one embodiment.

Likewise, individual aspects (sometimes called species) of the invention are provided as examples, and, accordingly, one of ordinary skill in the art may recognize from a following exemplary structure (or a following exemplary act) that a substantially equivalent structure or substantially equivalent act may be used to either achieve the same results in substantially the same way, or to achieve the same results in a not dissimilar way.

Accordingly, the discussion of a species (or a specific item) invokes the genus (the class of items) to which that species belongs as well as related species in that genus. Likewise, the recitation of a genus invokes the species known in the art. Furthermore, it is recognized that as technology develops, a number of additional alternatives to achieve an aspect of the invention may arise. Such advances are hereby incorporated within their respective genus, and should be recognized as being functionally equivalent or structurally equivalent to the aspect shown or described.

Second, the only essential aspects of the invention are identified by the claims. Thus, aspects of the invention, including elements, acts, functions, and relationships (shown or described) should not be interpreted as being essential unless they are explicitly described and identified as being essential. Third, a function or an act should be interpreted as incorporating all modes of doing that function or act, unless otherwise explicitly stated (for example, one recognizes that "tacking" may be done by nailing, stapling, gluing, hot gunning, riveting, etc., and so a use of the word tacking invokes stapling, gluing, etc., and all other modes of that word and similar words, such as "attaching"). Fourth, unless explicitly stated otherwise, conjunctive words (such as "or", "and", "including", or "comprising" for example) should be interpreted in the inclusive, not the exclusive, sense. Fifth, the words "means" and "step" are provided to facilitate the reader's understanding of the invention and do not mean "means" or "step" as defined in §112, paragraph 6 of 35 U.S.C., unless used as "means for-functioning-" or "step for -functioning-" in the Claims section.

Discussion of the Figures.

The invention can be characterized as a method and system that enables a restaurant to identify a customer, collect customer data elements, store customer data elements in an electronic repository, and provide customer tracking. In addition, the invention provides customer managed food and beverage ordering, customer infotainment, customer managed payment, customer managed purchase of post-dining entertainment, and customer reporting and real time access to customer data. In a preferred embodiment, the method may be implemented as a system that identifies, stores, tracks, provides ordering, infotainment, post-dining entertainment, and reporting, in a platform such as a software program, for example. In an alternative embodiment, the method may be embodied as multiple software systems that work together to identify, store, track, and provide ordering, infotainment, payment, and post-dining entertainment, and reporting.

Features and advantages of the invention can be better understood by reviewing FIG. 1, which illustrates a restaurant customer management system 100 that identifies a customer, collects customer data elements, stores customer data elements in an electronic repository, provides customer data element tracking, a customer managed ordering means, infotainment, a customer operated payment means, customer ordering of post-dining entertainment, and customer reporting and real time access to customer data elements. The restaurant customer management system (RCMS) 100 comprises at least one customer unit 110 and a restaurant 120 having at least a pre-dining system 122, or a dining system 124, or a post-dining system 126.

A single piece of data is a data element, such as a surname, a phone number, a beverage preference, a desert preference, or an entree preference for example. A collection of data elements are a record. A data element that has been adapted, modified, processed, or queried is a data element result, such as a report that illustrates a list of family surnames that prefer a beverage type, for example.

The customer unit 110 is any person that requests at least one service at a restaurant 120 such as a reservation, food and/or beverage service, or entertainment, for example. Preferably, a customer unit 110 is a collection of people such as a family, a group of friends, a group of business colleagues, or a group of co-workers, for example. People include children and adults.

The restaurant 120 is any entity that provides food, beverage, and/or entertainment services to a customer unit 110. Restaurants may be sub entities in hospitality institutions, however, are more commonly embodied as curb side, brick and mortar establishments. Hospitality establishments include, but are not limited to, hotels, casinos, resorts, and cruise ships, for example. Restaurants are companies that are owned by a single owner or multiple owners. Restaurants may be individual establishments or establishments that are part of a group, family, franchise or chain.

In a preferred embodiment, the RCMS 100 comprises at least one customer unit 110 and a restaurant 120 having a pre-dining system 122, a dining system 124, and a post-dining system 126. Alternatively, the RCMS 100 may comprise at least one customer unit 110 and a restaurant 120 having only a post-dining system 126. In yet another embodiment, the RCMS 100 may comprise at least one customer unit 110 and a restaurant having a pre-dining system 122 and a post-dining system 126. It is apparent to those skilled in the art that the RCMS 100 may include various combinations of systems.

The pre-dining system 122 is any system that identifies a customer unit 110, manages reservations, manages queue assignment, pages a customer unit 110, and updates a table management system. In a preferred embodiment, customer unit 110 identification is accomplished by the customer unit 110 logging into the RCMS pre-dining system 122 by a credit card upon arrival at the restaurant 120, preferably via a handheld terminal device. Customer identification may be alternatively accomplished via other identification information devices such as an RFID tag, fingerprint or retina scan, or by logging in with a user name and password.

Terminal devices may include handheld computers, such as Personal Digital Assistants (PDAs), palm-sized and clamshell computers, for example. In addition, terminal devices include smart phones, mobile phones, wrist PDAs, thin clients, kiosks, tablet computers, desktops PCs, internet appliances, and other device know to those skilled in the art, for example. Terminal devices may be wired or wireless enabled.

Once logged into the pre-dining system 122, a customer unit 110 record is managed through a seating queue assignment. The queue assignment provides estimated wait time and pages a customer unit 110 when a table is ready. Furthermore, the table management system (TMS) is updated with the customer unit 110 table location and the customer unit 110 is removed from the seating queue.

Alternatively, customer unit 110 identification may be accomplished by the customer unit 110 announcing themselves to a Maitre d', swiping a smart card, credit card, or VIP card, or logging in using a keypad or touch screen into the restaurant customer management system via a kiosk, smart phone, mobile phone, or automatically being identified by other means such as Radio Frequency ID (RFID), retina or fingerprint scan, or voice identification.

The dining system 124 is any system that provides an interactive menu, restaurant staff paging capabilities, meal preparation time estimates, and infotainment. In a preferred embodiment, the dining system 124 is operated by the customer unit 110. Interactive menus are provided that include food and beverage items currently available based on the time of day, such as breakfast, lunch, or dinner, among other inputs such as current product inventory, for example. In addition, restaurant staff may be paged by a customer unit 110 as needed. Furthermore, meal preparation time estimates are reported from a kitchen management system (KMS) to the terminal device, such that the customer unit 110 may track the amount of time remaining before their meal arrival. Lastly, infotainment may be provided while the customer unit 110 is waiting for his or her meal, such as interactive games, live internet access, and email, for example.

The post-dining system 126 is any system that provides customer self-checkout and payment processing, post-dining surveys, advance purchase of post-dining entertainment, customer unit 110 profile updating, and loyalty rewards. In a preferred embodiment, the post-dining system 126 is operated and managed by the customer unit. An itemized bill is presented to the customer unit 110 that may be retrieved from the restaurant Point of Sale (POS) terminal. The customer unit 110 may choose to split the bill between others or the customer unit 110 may pay for the bill in full. Gratuity may be added manually or by selecting a predefined percentage from a drop down list via a graphical user interface software system. In addition, the customer unit 110 may pay for the bill using a credit card, smart card, ATM card, or other means such as cellular phones or RFID systems that are linked to payment facilities of the customer unit, for example. Furthermore, a card reader and/or other readers such as RFID may be directly integrated within the terminal device. Digital signature capture is used to close the transaction.

The customer may complete a post-dining survey regarding the food, facilities, staff, or restaurant atmosphere, for example. The customer unit 110 may also purchase in advance a post-dining entertainment unit such as movie ticket, for example. The meal receipt, movie receipt, movie tickets, and loyalty rewards print after the customer profile is updated. Loyalty rewards may include, a free desert at an affiliated restaurant, a free beverage at the current restaurant, or a discounted movie ticket at a nearby theater, for example. A customer profile may be updated with a new phone number, email, or street address, for example.

The restaurant 120 stores all of the customer unit 110 selections, or data elements, collected through the pre-dining, dining, and post-dining system in a RCMS 100 database. Databases may include software systems such as Oracle, Microsoft SQL Server, or DB2, for example. In addition, each customer unit 110 data element is tied to a customer unit 110 record that the restaurant 120 may evaluate to improve service, offer discounts, or promote advertisements. The restaurant 120 may evaluate customer records, by reviewing reports that list data element results. Furthermore, a restaurant 120 may share data element results with other restaurants or consumer preference agencies.

Figure 2:
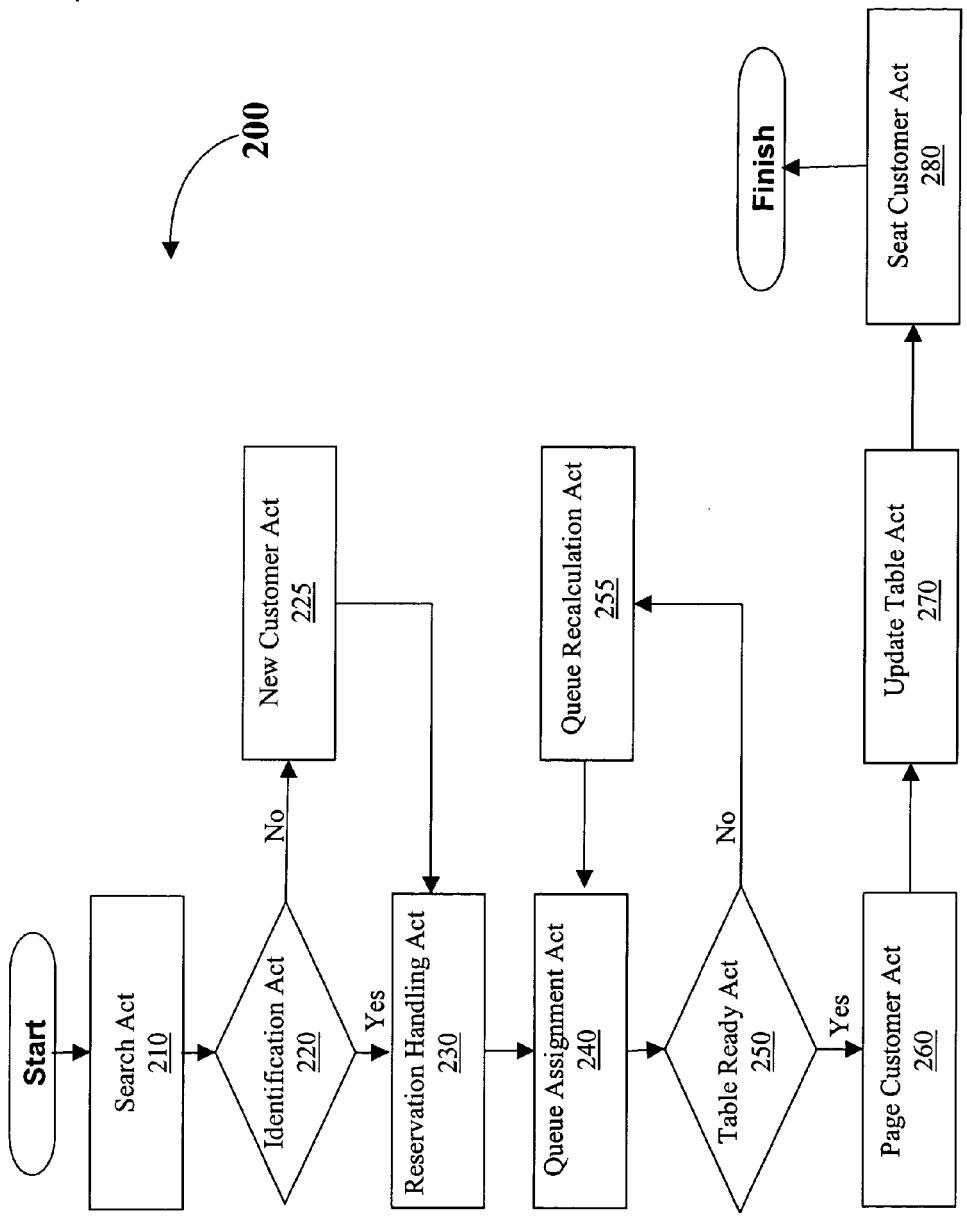
FIG. 2 illustrates a pre-dining method.

FIG. 2 illustrates the pre-dining method 200. In a preferred embodiment, the customer initiates this process by searching for a restaurant via the search act 210. The customer may choose to search for a restaurant by reviewing a list of restaurants online or via a telephone book. Alternatively, the customer may select a restaurant from memory based on a past experience. In yet another embodiment, the customer may log into a special web portal providing a list of restaurants based on a set of preferences.

Once the customer arrives at the restaurant selected, the RCMS identifies the customer through an identification act 220. The identification act 220 searches for a unique customer record data element, or key, in a database system. The key may be a phone number, surname, or credit card number for example. If no key is found, a new key is created and tied to the customer through the new customer act 225.

If a key is present and tied to an advance reservation, a reservation handling act 230 notifies a queue assignment act 240 that a customer with a reservation has arrived and is ready for a table. The queue assignment act 240 places the customer on the waiting list and queries if a table is ready, through a table ready act 250.

If a key is present and not tied to an advance reservation, the reservation handling act 230 notifies the queue assignment act 240 that a customer without a reservation has arrived and is ready for a table. The queue assignment act 240 places on the waiting list and queries if a table is ready, through the table ready act 250.

In a preferred embodiment, if a table is ready, the table ready act 250 will proceed to a page customer act 260, whereby the waiting customer is paged and notified that a table is ready. In one embodiment, the page could be sent to the customer unit's mobile pager or a phone call could be originated to the customer unit's mobile telephone when the estimated queue period drops to a time either pre-set, or based on intelligent information such as the customer's current location gathered electronically via the Global Positioning System, the mobile telephone positioning network, or other techniques. The location information may be incorporated with other pertinent information as input to the queuing system to estimate the time it takes for the customer to return to the restaurant location and be on time when their reservation reaches the top of the queue.

If a table is not ready, a queue recalculation act 255 recalculates the estimated wait time. Once a customer is paged via the page customer act 260 and the page is accepted, the table management system (TMS) is updated and the customer is assigned to an empty table via a update table act 270. The customer is then directed by the host or Maitre d' to the ready table, via a seat customer act 280.

Figure 3:
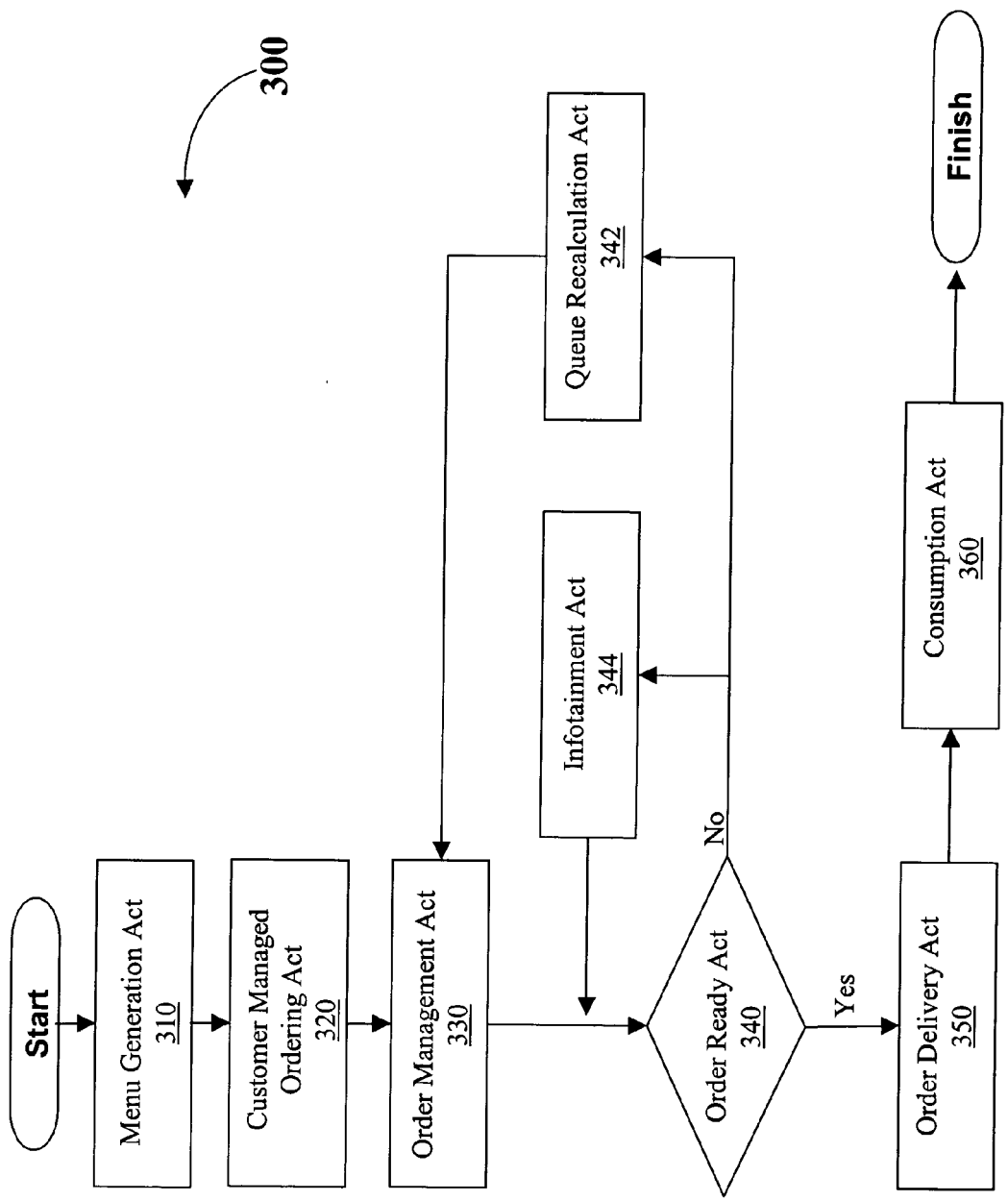
FIG. 3 illustrates a dining method.

FIG. 3 illustrates the dining method 300. In a preferred embodiment, once the customer is seated the dining method 300 is initiated. Preferably, the dining method 300 is managed by the customer on a wireless enabled handheld computer. Once the dining method is initiated an interactive menu is provided to the customer. The interactive menu may be customized based on data elements collected about the customer on previous visits, such as preferences, for example, or based on the time of day (breakfast, lunch, or dinner). The interactive menu is pushed to the customer's terminal device via a menu generation act 310.

In a preferred embodiment, a menu generation act 310 occurs when the customer is being directed to their seat. The interactive menu is generated such that it may be subdivided into two sections. The first section may provide a list of previously ordered food and beverage items or recommended food or beverage items based on customer preference. The second section may provide a list of menu items based on the time of day. The interactive menu is sent wireless to a handheld computer for customer review. In an alternative embodiment, a terminal device integrated within a table may display the menu.

Once the customer has reviewed the menu, he or she will manage the ordering process via a customer managed ordering act 320 by placing a food and or beverage order directly to the kitchen order system (KOS). This is accomplished by selecting menus items on the terminal device and submitting the order. Each menu selection is customer data element that is stored in the RCMS database along with the customer record.

Once the order is submitted, the KOS manages the meal preparation and inventory management through an order management act 330. In addition, the KOS tracks preparation time for each menu item and estimates completion time. In one embodiment, preparation time may be tracked utilizing RFID tagged plates or glasses that move from station to station. Furthermore, the total preparation time may be stored in the RCMS database such that it may be queried to improve meal preparer performance or to more accurately calculate meals requiring more preparation time, for example.

The KOS is continually queried by the order management act 330 to determine if a meal or collection of meals is ready. If a meal or collection of meals is not ready KOS provides feedback to the order management act 330 via an order ready act 340. Furthermore, a queue estimate recalculation act 342 is initiated and a new time estimate of when a meal or collection of meals is estimated to be ready is displayed to the customer. Simultaneously, through this process, the customer may be entertained via an infotainment act 344. The infotainment act provides subscription and non-subscription based entertainment services such as games, music, streaming video, and internet access, for example.

If a meal or a collection of meals is ready, the order ready act 340 initiates an order delivery act 350 that pages a restaurant staff member to deliver the food and/or beverage items to the customer table. Once the food is delivered the customer consumes the food and beverage through a consumption act 360.

Figure 4:
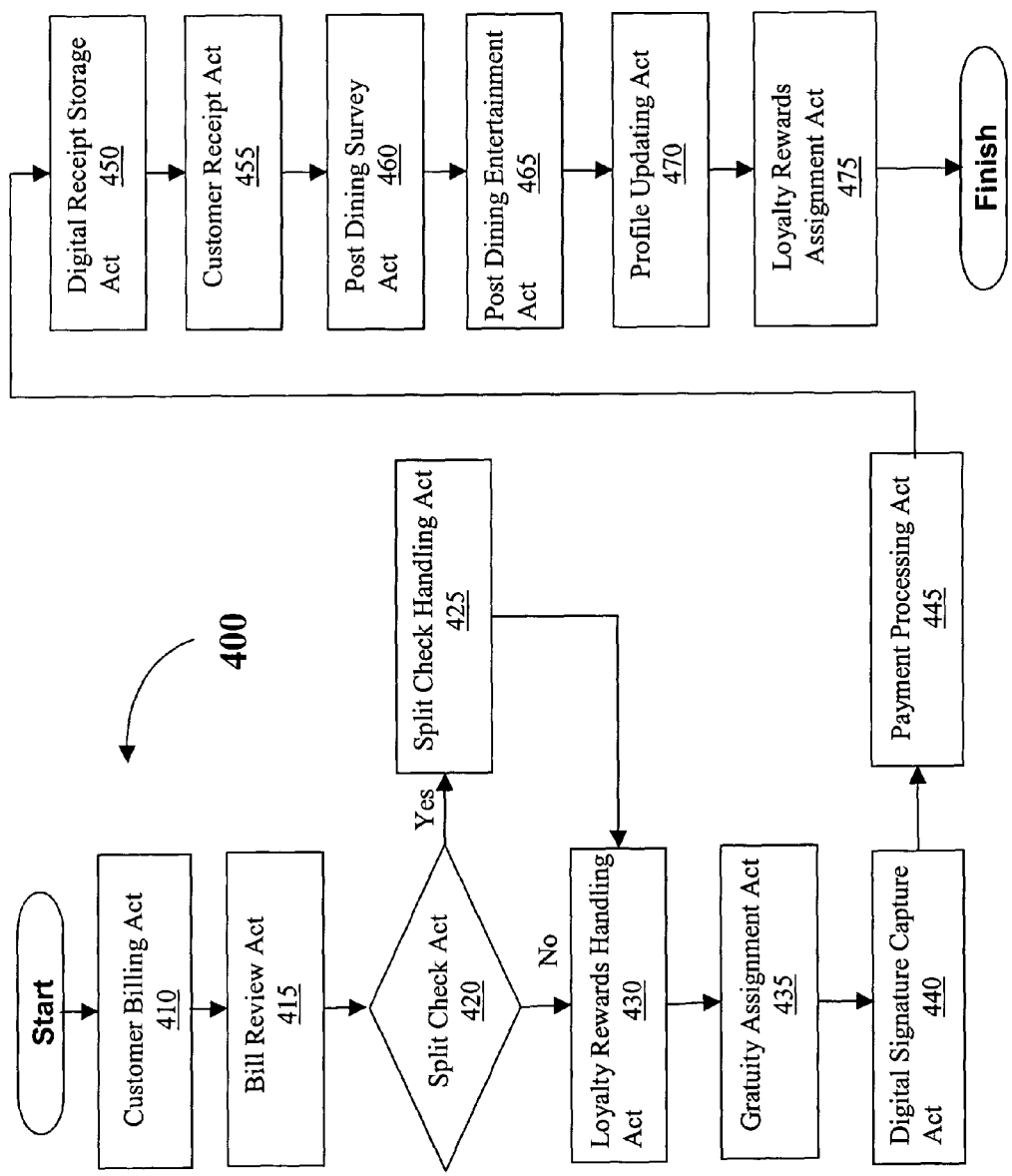
FIG. 4 illustrates a post-dining method.

FIG. 4 illustrates a post-dining method 400. In a preferred embodiment, the post-dining method is initiated when the consumption act 360 is complete. Upon initiation of this method, a customer bill act 410 notifies the RCMS that the customer is ready to check out. The RCMS then informs the point of sale (POS) system to upload the bill to the customer terminal device. Once the bill is received the customer reviews the bill via a bill review act 415. After the customer has reviewed the bill, a split bill act 420 allows the customer to split the bill between other people at his or her table. If a customer decides to split the bill, various options are present via a split bill handling act 425 otherwise, loyalty rewards, such as coupons, are requested via a loyalty rewards handling act 430. The loyalty rewards handling act 430 deducts coupons or other promotions from a customer bill.

Once the loyalty rewards handling act 430 is complete the customer may add gratuity via a gratuity assignment act 435 thus enabling a customer to pick from a list of pre-defined gratuity percentages or allowing a customer to manually add a gratuity of their choice. The gratuity assignment act 435 performs the calculations for accurately including percentages and addition. After the customer has completed the gratuity assignment act 435, payment means is selected. Payment means may include, cash, check, a money order, a cashier's check, a traveler's check, a gift card, a smart card, a bank card, an ATM card, a VISA®, MasterCard®, Discover®, or American Express® credit card, RFID payment systems, cellular phone payment systems, or an online payment service, such as PayPal™, account number, for example. After the payment means has been selected the customer approves of and completes the transaction, via a digital signature capture act 440. Once the customer's digital signature is captured the payment processing begins, via a payment processing act 445.

During the payment processing act 445, the appropriate systems are contacted in order to complete the transaction and payment is transferred from the customer to the restaurant which may include automatically closing out the transaction in the restaurant Point of Sale (POS) system such that the restaurant staffs need not to be involved. After the transaction is complete, the digital receipt is stored in the RCMS database via a digital receipt storage act 450 and a copy prints from the terminal device for the customer via a customer receipt act 455.

Once the customer receipt is printed, a survey is presented to the customer via a post-dining survey act 460 that questions the customer about the dining experience. The survey responses are data elements that are stored in the RCMS database for evaluation by restaurant staff and management. In a preferred embodiment, survey completion is required. In an alternative embodiment, the survey may be bypassed. Completing a survey may contribute to a customer's loyalty reward assignment.

After the survey is complete, the opportunity to purchase a post-dining entertainment unit in advance is presented to the customer via a post-dining entertainment act 465. The customer may purchase the post-dining entertainment unit directly from the terminal device. The post-dining entertainment unit may be provided by restaurant partners or affiliates.

Once the customer selects an activity the transaction may be completed. A digital signature is required, payment is received, a receipt is printed, and other items confirming the transaction, such as movie tickets, for example, are printed. The post-dining activities the customer selects are data elements that are stored in the restaurant customer management system database that may be reviewed by the restaurant, restaurant affiliates, or partners, for example. In the preferred embodiment, the restaurant will receive a portion of the sale as revenue to the establishment.

Upon completion of the post-dining entertainment act 465, the customer profile is updated in the restaurant customer management system database. All data elements collected during the dining process are stored accordingly with the customer record via a profile updating act 470. Once completed, the RCMS provides loyalty rewards via a loyalty rewards assignment act 475, based on criteria stored in the RCMS database. In a preferred embodiment, the customer is presented with a selection of reward options. The customer chooses a single option and that option is printed by the terminal device. After the loyalty reward assignment act 475 is complete, the post-dining method 400 is complete and the customer may leave the restaurant when ready.

In an alternative embodiment, the customer may receive the menu payment receipt after the loyalty reward assignment act 475. In yet another embodiment, the menu receipt, the entertainment purchase receipt, movie tickets, and loyalty rewards may all be printed on one receipt following the reward assignment act 475. It is apparent to those skilled in the art, that a receipt for any transaction may be presented immediately after a transaction is completed or at the end after all transactions are completed.

Figure 5:
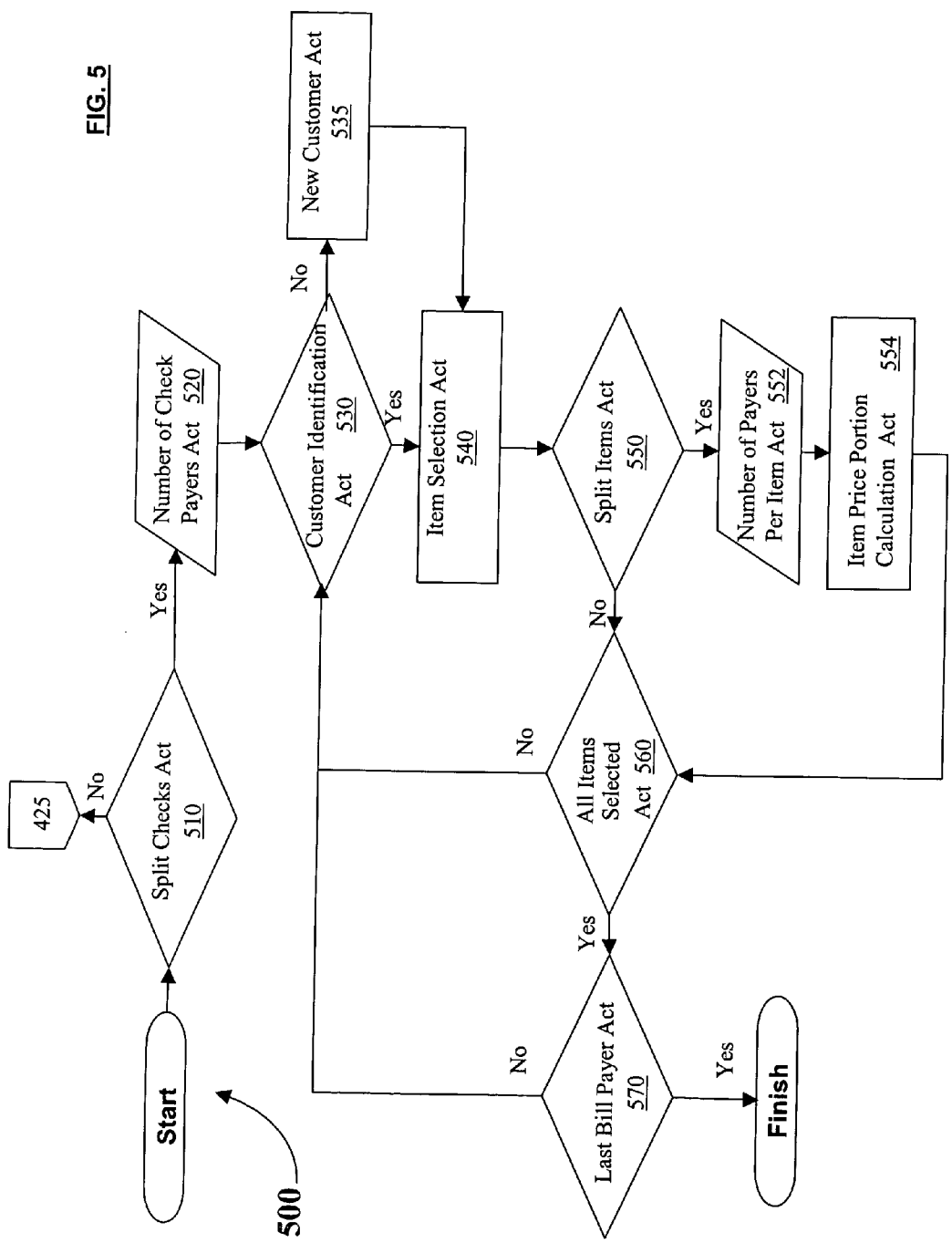
FIG. 5 illustrates a post-dining method spilt bill act.

FIG. 5 illustrates the details of the split bill handling act 500 of the post-dining method. In a preferred embodiment, a split bill act 510 is initiated after the customer reviews the bill, in a bill review act 415 (FIG. 4). If the customer decides not to split the bill, the split bill act is bypassed and the customer proceeds to a loyalty rewards handling act 430 (FIG. 4).

If the customer selects to split the bill the customer is provided the option by the split bill act 510 to manually subdivide the bill evenly between people, by person, or subdivide an item by a number of people paying. Once a customer decides to split the bill, the number of people paying at the table is identified through a number at table act 520. In a preferred embodiment, the first customer would select the number of people that are dining at the table. The first customer proceeds through the process and is identified through a customer identification act 530, whereby the customer is tied to a unique customer record in the RCMS database. If no record is found, a new record is created via a new customer act 535.

Next, the first customer selects items for which they are to pay for via an item selection act 540. In one embodiment, the item selection act allows the customer to drag items to a box that represents his or her place setting at the table. It is apparent to those in the art, that alternative graphical representation may be implemented to accomplish the same task utilizing various graphical user interface software systems.

After the first customer selects all items for which they are to pay for, the first customer may then further divide a food or beverage item between themselves and other paying customers sitting at the table. For example, the first customer may have shared an appetizer with a second customer. The first customer and second customer agree to split the cost of this food item. In a split item act 550, the first customer may designate that the food item is shared between the first customer and the second customer, via a number per item act 552 and the food item cost is automatically split via an item portion calculation act 554 and the payment amount due appears on the first customer's bill. If the customer does not select to subdivide a food item, the process proceeds to an all items selected act 560.

Once the first customer selects all items that he or she is to pay for and is complete with splitting the bill, the customer proceeds to a loyalty rewards handling act 430 (FIG. 4) and continues to proceed until completing the loyalty rewards assignment act 475. If the first customer is not the last customer to pay the bill and a balance remains, a last bill payer act 570 is triggered and returns to a customer identification act 530, however, the first customer is marked as paid on the table list, their individual bill is marked closed, and their expenses are removed from the bill balance. If the second customer, or other subsequent customer, is the last customer to pay the bill and no balance remains, the split bill handling act 425 method loop is terminated and a thank-you message may appear on the terminal device display.

Figure 6:
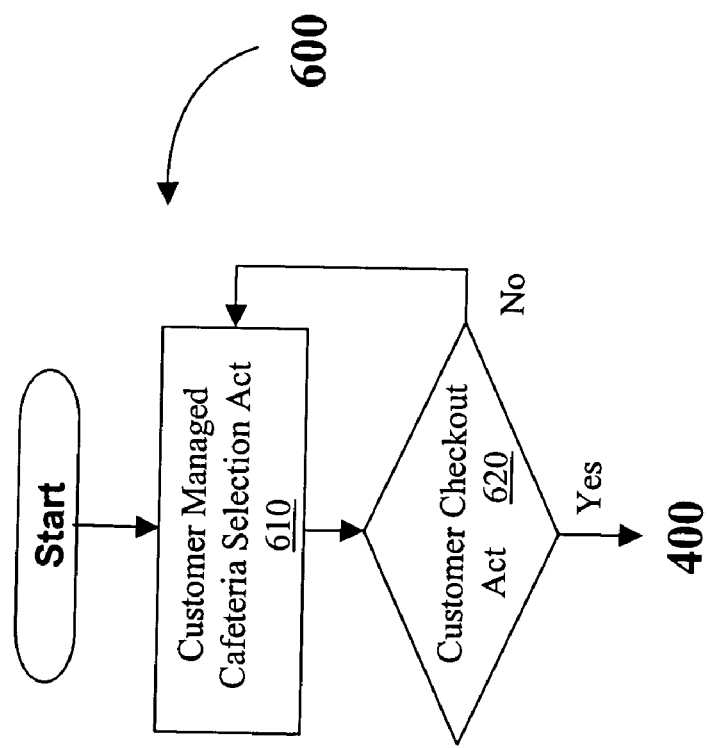
FIG. 6 illustrates a cafeteria method.

FIG. 6 illustrates a cafeteria dining method 600 whereby a customer unit may walk along a cafeteria line, in a cafeteria type establishment, and select food and beverage items of choice. In one embodiment the customer unit takes their own food and/or beverage items from a counter top via a customer managed cafeteria selection act 610. The customer unit may return to the cafeteria line as often as they wish to select items. Once the customer unit has selected all items of choice the customer unit pays for all items via a customer check out act 610

In a preferred embodiment, the customer check out act 610 enables the customer unit to pay for items selected thru a customer managed payment system, such as a wireless enabled handheld computer having a graphical user interface that allows the customer unit to identify items selected and pay for the selected items via the method described in the post-dining method 400 (FIG. 4).

In an alternative embodiment, cafeteria items such as trays, plates, and glasses may be tagged with RFID tags. As the customer unit selects items from the cafeteria line, a terminal device, identifies and tallies all the items the customer unit has selected utilizing RFID. Once all items are selected the customer unit may pay for the items via the post-dining method 400 (FIG. 4).

In yet another embodiment, a customer unit may identify themselves to a system using a customer identification means, such as a credit card or RFID tag, for example. Preferably, all food and beverage item plates and glasses are RFID tagged. As the customer unit selects an item, the item is added to their selection list automatically as the remove an item from the counter. In addition, to prevent theft items may only be removed from the counter after the customer unit is associated with an item. One methodology of preventing theft is a security means that uses serving dishes containing metal which are held by an electromagnet, until a customer unit and item association is made. Another security means that may be used is a physical barrier such as a glass door, for example, which will prevent a customer unit from taking an item until the customer unit and item association is made.

Thus, though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications

I claim:

1. A method of restaurant customer management, comprising:
   logging a customer unit into a restaurant pre-dining system with a mobile phone of the customer unit;
   responsive to logging the customer unit into the restaurant pre-dining system, placing the customer unit on a waiting list for a table;
   paging the mobile phone with a page that notifies the customer unit that the table is ready for the customer unit;
   sending an interactive restaurant menu to the mobile phone;
   receiving at least one customer request of at least one service of the restaurant from the mobile phone;
   uploading, by a post-dining system of the restaurant, a bill for the at least one service from a point of sale system of the restaurant to the mobile phone; and
   performing a customer self-checkout whereby payment for the at least one service is submitted by the customer unit via the mobile phone to the point of sale system.

2. The method of claim 1 wherein the customer unit is a single group of people.

3. The method of claim 1 wherein the mobile phone is implemented in a wireless enabled handheld computer.

4. The method of claim 1 further comprising:
   identifying, by the pre-dining system, the customer unit;
   managing, by the pre-dining system, queue assignment that includes the waiting list;
   updating, by the pre-dining system, a table management system; and
   storing, by the pre-dining system, at least one customer data element in a database.

5. The method of claim 1 wherein the restaurant comprises a dining system, and wherein the interactive restaurant menu is sent to the mobile phone via the dining system.

6. The method of claim 1 wherein the restaurant includes a self-check out and payment processing system that uploads the bill, the method further comprising:
   capturing, by the self-check out and payment processing system, a digital signature from the mobile phone.

7. The method of claim 1, further comprising:
   providing, by the post dining system, a post-dining survey;
   collecting, by the post dining system, at least one customer data element from the customer unit via the mobile phone; and
   storing the customer data element in a database.

8. The method of claim 1, further comprising enabling, by the post-dining system, the customer unit to pre-purchase an entertainment unit prior to leaving the restaurant via the mobile phone and receive a confirmation of the entertainment unit purchase.

9. A restaurant customer management system that manages customer data elements, the system comprising:
   a software program that receives at least one customer request of at least one service from a restaurant from a mobile phone of a customer unit;
   a restaurant pre-dining system that logs in the customer unit that issues the customer request and pages the mobile phone thereby notifying the customer unit that a table is ready for the customer unit;
   a dining system that sends an interactive restaurant menu to the mobile phone;
   a customer managed post-dining system that uploads a bill for the at least one service from a point of sale system of the restaurant to the mobile phone and performs a customer self-check out and payment processing-whereby payment for the at least one service is submitted by the customer unit via the mobile phone to the point of sale system.

10. The restaurant customer management system of claim 9 further comprising a database, wherein a digital receipt is stored in the database.

11. The restaurant customer management system of claim 9 wherein the customer unit is provided a graphical user interface for selection of a gratuity on the mobile phone.

12. The restaurant customer management system of claim 9 further comprising an electronic repository that stores a customer data element comprising an online payment service provider account number.

13. The restaurant customer management system of claim 9 wherein the restaurant is a cafeteria establishment, the system further comprising:
   a customer managed payment system implemented as a computer having a graphical user interface that allows the customer unit to identify cafeteria items selected and pay for the items.

14. The restaurant customer management system of claim 13 wherein the items are tagged with RFID tags, the system further comprising a terminal device that tallies the items by utilizing the RFID tags.

15. The restaurant customer management system of claim 9 wherein submission of payment is facilitated by an RFID card.

16. A method of splitting a customer bill on a terminal device comprising:
- identifying a number of people at a table;
- identifying a person associated with a restaurant menu item;
- splitting at least one restaurant item between at least two people;
- monitoring a bill balance;
- splitting the bill balance into at least two bills each respectively associated with one of the people at the table; and
- closing the at least two bills for each of the associated people at the table.

17. A method of splitting a customer bill on a terminal device of claim 16 wherein identifying a person associated with a restaurant menu item is accomplished by a customer manipulating a software system graphical user interface on a terminal device.

18. A method of splitting a customer bill on a terminal device of claim 16 wherein closing the at least two bills comprises:
- tracking, by a restaurant customer management system, a customer data element storing, by the restaurant customer management system, a customer data element;
- running, by a terminal device having an operating system, a graphical user interface software, digital signature capture software, and payment processing software; and
- printing, by a printer, a customer receipt.

\* \* \* \* \*